(No Model.)

P. F. CHAMBERS.
SHAFT FOR VEHICLES.

No. 571,213.  Patented Nov. 10, 1896.

WITNESSES
Arthur Ashley
H. L. Coombs

INVENTOR
Perry F. Chambers
by L. Deane & Son
his Attorneys.

UNITED STATES PATENT OFFICE.

PERRY F. CHAMBERS, OF LA CYGNE, KANSAS.

SHAFT FOR VEHICLES.

SPECIFICATION forming part of Letters Patent No. 571,213, dated November 10, 1896.

Application filed October 15, 1895. Serial No. 565,774. (No model.)

*To all whom it may concern:*

Be it known that I, PERRY F. CHAMBERS, a citizen of the United States, residing at La Cygne, in the county of Linn and State of Kansas, have invented certain new and useful Improvements in Shafts for Vehicles; and I do hereby declare the following to be a full, clear, and exact description of the invention, such as will enable others skilled in the art to which it appertains to make and use the same.

My invention relates to improvements in shafts for vehicles, which can be connected therewith at one side of the center thereof, so as to allow the horse to travel out in the beaten track, means being provided for equalizing the draft, so that the strain will be the same at both sides of the vehicle.

The invention consists in the novel construction and combination of parts hereinafter fully described and claimed.

Figure 1:
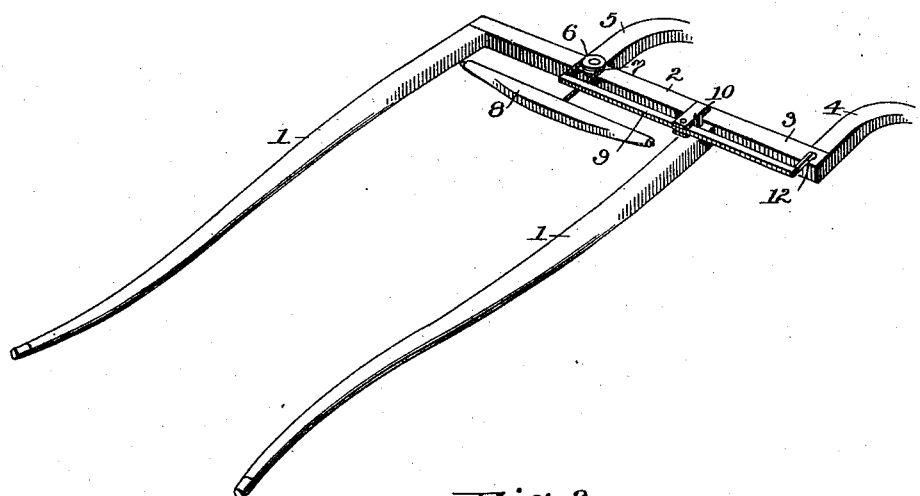
Figure 2:
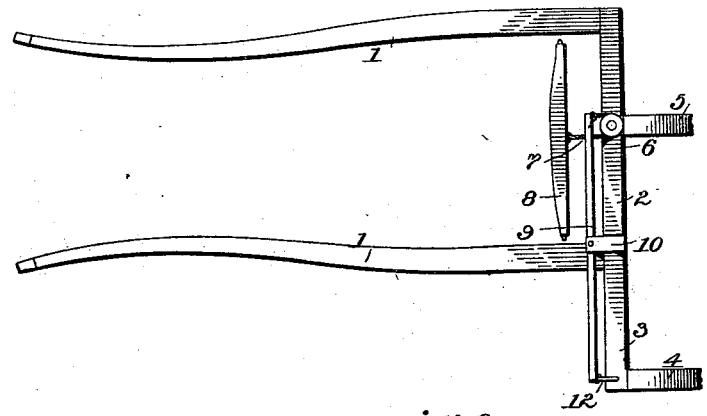
Figure 3:
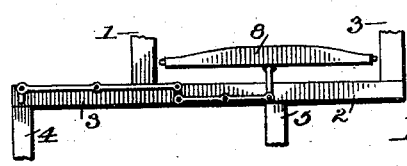

In the accompanying drawings, Figure 1 is a perspective view of the shafts and draft-equalizer constructed in accordance with my invention. Fig. 2 is a plan view of the same. Fig. 3 is a plan view of the modification.

In the said drawings, the reference-numeral 1 designates the shafts of a vehicle connected together at the inner ends by a cross-bar 2, one end of which extends a short distance beyond one of the shafts forming an extension 3. Secured to the end of this extension is one of the thills 4, while the other thill 5 is secured to the cross-bar 2 about midway of its length. These thills are to be connected with a buggy, carriage, or other vehicle in any ordinary or suitable manner. Journaled to one end of the thill 5 is a pulley 6, around which passes a cord or rope 7, one end of which is secured to a singletree 8. The other end of the rope or cord is secured to a lever 9, pivoted to a block 10, secured to the cross-bar 2. The other end of this lever is connected by a rod or bar 12 with the end of the extension 3.

When in use, the horse can walk in the beaten track and the strain will be equalized on both sides, as the pull upon the singletree will tend to draw the end of the lever with which it is connected backward and to force the opposite end forward, thus having the same effect as if a horse were connected at both ends of the lever.

In Fig. 3 I have shown a modification which in some instances may be used with advantage. In this form the lever is made in two parts connected together by a link. By this construction the pulley may be dispensed with.

Having thus fully described my invention, what I claim is—

The combination with the shafts, the cross-bar secured to the inner ends thereof, having an extension projecting laterally beyond one of said shafts, and the thills, one of which is secured to the end of said extension and the other secured to the cross-bar midway between the shafts, of the pulley pivoted to said cross-bar intermediate the shafts, the chain passing therearound, the singletree to which one end of said chain is secured, the lugs secured to the cross-bar, the lever pivoted thereto, to the inner end of which the other end of said chain is secured, and the rod or bar secured to the end of said extension to which the outer end of said lever is connected, substantially as described.

In testimony whereof I affix my signature in presence of two witnesses.

PERRY F. CHAMBERS.

Witnesses:
GEO. S. TURNER,
THOS. L. CHAMBERS.